United States Patent
Kunc et al.

(10) Patent No.: US 11,111,359 B2
(45) Date of Patent: Sep. 7, 2021

(54) METHOD FOR PRINTING LOW-DENSITY POLYMER STRUCTURES

(71) Applicant: UT-BATTELLE, LLC, Oak Ridge, TN (US)

(72) Inventors: Vlastimil Kunc, Oak Ridge, TN (US); John M. Lindahl, Knoxville, TN (US); Lonnie J. Love, Oak Ridge, TN (US); Brian K. Post, Oak Ridge, TN (US); Ahmed Hassen, Oak Ridge, TN (US); Peng Liu, Oak Ridge, TN (US); Thomas Zeke Sudbury, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 86 days.

(21) Appl. No.: 16/403,995

(22) Filed: May 6, 2019

(65) Prior Publication Data
US 2019/0338106 A1 Nov. 7, 2019

Related U.S. Application Data

(60) Provisional application No. 62/667,496, filed on May 5, 2018.

(51) Int. Cl.
| | |
|---|---|
| *B29C 67/20* | (2006.01) |
| *C08J 3/20* | (2006.01) |
| *C08K 3/04* | (2006.01) |
| *C08K 3/36* | (2006.01) |
| *C08K 7/22* | (2006.01) |
| *C08K 7/26* | (2006.01) |
| *C08K 7/28* | (2006.01) |
| *C08K 7/06* | (2006.01) |
| *B29C 64/165* | (2017.01) |
| *B29C 64/118* | (2017.01) |
| *B33Y 70/00* | (2020.01) |
| *B33Y 10/00* | (2015.01) |
| *B29K 55/02* | (2006.01) |
| *B29K 509/08* | (2006.01) |
| *B29K 507/04* | (2006.01) |
| *B29K 105/16* | (2006.01) |
| *B29K 77/00* | (2006.01) |

(52) U.S. Cl.
CPC .............. *C08K 7/28* (2013.01); *B29C 64/118* (2017.08); *B29C 64/165* (2017.08); *B33Y 70/00* (2014.12); *C08J 3/201* (2013.01); *C08K 7/06* (2013.01); *B29K 2055/02* (2013.01); *B29K 2077/00* (2013.01); *B29K 2105/16* (2013.01); *B29K 2105/165* (2013.01); *B29K 2507/04* (2013.01); *B29K 2509/08* (2013.01); *B29K 2995/0063* (2013.01); *B29K 2995/0064* (2013.01); *B33Y 10/00* (2014.12)

(58) Field of Classification Search
CPC ... B29C 64/106; B29C 64/112; B29C 64/118; B29C 67/20; B29K 2055/02; B29K 2077/00; B29K 2105/16; B29K 2105/165; B29K 2507/04; B29K 2509/08; B29K 2995/0063; B29K 2995/0064; B33Y 10/00; B33Y 70/10; C08J 3/20; C08J 3/201; C08K 3/04; C08K 3/36; C08K 7/22; C08K 7/24; C08K 7/26; C08K 7/28
USPC ....... 264/308, 331.13, 331.19; 524/492, 493, 524/494, 847
See application file for complete search history.

(56) References Cited

U.S. PATENT DOCUMENTS

| | | | |
|---|---|---|---|
| 2003/0015815 A1* | 1/2003 | McClelland | B29C 44/105 264/51 |
| 2017/0021566 A1* | 1/2017 | Lund | B29C 64/106 |
| 2017/0057159 A1* | 3/2017 | Lam | B29C 64/106 |
| 2019/0329491 A1* | 10/2019 | Yu | B33Y 10/00 |
| 2021/0002793 A1* | 1/2021 | Nyaribo | B33Y 70/00 |

* cited by examiner

Primary Examiner — Leo B Tentoni
(74) Attorney, Agent, or Firm — Warner Norcross + Judd LLP

(57) ABSTRACT

A method of forming a low-density three-dimensional article is provided. The method includes printing a low-density composition on a substrate to form at least one layer comprising the low-density composition. The low-density composition includes a (P) polymer component and (M) a microsphere component in a ratio by volume (P):(M). The method also includes selectively controlling a density of the low-density composition during printing to give the at least one layer on the substrate. Selectively controlling the density of the low-density composition includes varying the ratio (P):(M) during printing. The method further includes repeating the printing and selectively controlling the density of the low-density composition to form additional layer(s), thereby forming the low-density three-dimensional article. A low-density three-dimensional article prepared in accordance with the method is also provided.

17 Claims, No Drawings

METHOD FOR PRINTING LOW-DENSITY POLYMER STRUCTURES

CROSS-REFERENCE TO RELATED APPLICATION

This application claims the benefit of U.S. Provisional Application 62/667,496, filed May 5, 2018, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to additive manufacturing methods and, more specifically, to methods of forming low-density three-dimensional articles via printing of low-density compositions.

Polymer-based low-density materials possess great potential in various applications, and demands for tailoring the functionality of such materials have grown rapidly in recent years. Unfortunately, very few fillers or additives have lower density than a typical polymer resin, and thus conventional processes for producing polymer-based low-density materials are limited. Moreover, composites formed from introducing solid fillers to a polymer composition typically have increased viscosities, leading to a decrease in processability of such composites in forming articles therefrom.

Recently, additive manufacturing processes have been demonstrated with certain types of polymer-based materials (e.g. polylactic acid (PLA), acrylonitrile butadiene styrene (ABS), etc.). However, conventional large-scale additive manufacturing processes are typically based on extrusion deposition (e.g. fused filament fabrication, fused deposition modeling, etc.) with polymer compositions having a density near or above the specific density of water, and typically suffer from the disadvantages described above. In particular, these materials are unsuitable in certain end applications based on physical or chemical limitations, cost, slow solidification (or cure) times, improper viscosity, etc.

SUMMARY OF THE INVENTION

A method of forming a low-density three-dimensional article is provided. The method comprises printing a low-density composition on a substrate to form at least one layer comprising the low-density composition. The low-density composition comprises a (P) polymer component and (M) a microsphere component in a ratio by volume (P):(M). The method also comprises selectively controlling a density of the low-density composition during printing to give the at least one layer on the substrate. Selectively controlling the density of the low-density composition comprises varying the ratio (P):(M) during printing. The method further comprises repeating the printing and selectively controlling the density of the low-density composition to form additional layer(s), thereby forming the low-density three-dimensional article.

A low-density three-dimensional article prepared in accordance with the method is also provided.

These and other features and advantages of the present invention will become apparent from the following description of the invention, when viewed in accordance with the accompanying examples and the appended claims.

DETAILED DESCRIPTION OF THE INVENTION

A method of forming a low-density three-dimensional article is provided. In particular, the method allows for printing low-density polymer structures comprising open or closed-cell expanded foam and/or syntactic foam, as exemplified by the embodiments herein. The method may be performed as a large-scale additive manufacturing process to form articles from lighter (i.e., lower density) materials or combinations of materials having different densities from one another, as well as articles from a single material having regions of varying densities from one another. As such, the method allows for selective control of localized and overall density of printed structures, which can be adjusted as necessary to fit particular applications. For example, a high-density material can be printed to form a perimeter of a printed article (e.g., a structure), and lightweight/low-density material can be printed as an infill of the structure.

As used herein, the term "low-density" is used relative to the specific density of water, such that low-density compositions and materials are those having a density less than 1 gram per cubic centimeter (i.e., g/cc). Likewise, low-density articles, such as the low-density three-dimensional article formed via the method, are those having a total density less than 1 g/cc, or comprising at least portion having a density less than 1 g/cc.

In general, the method comprises printing a low-density composition on a substrate, while selectively controlling a density of the low-density composition during printing, to form at least one layer comprising the low-density composition on the substrate. These elements of the method, along with various aspects thereof, are described in further detail below.

The term "printing" may be performed by any suitable apparatus known in the art of additive manufacturing (AM) and/or three-dimensional (3D) printing. ASTM Designation F2792-12a, which is titled "Standard Terminology for Additive Manufacturing Technologies" and herein incorporated by reference in its entirety, defines additive manufacturing as "a process of joining materials to make objects from 3D model data, usually layer upon layer, as opposed to subtractive manufacturing methodologies," and 3D printing as "the fabrication of objects through the deposition of a material using a print head, nozzle, or another printer technology." Examples of 3D printers include extrusion additive manufacturing printers, liquid additive manufacturing printers, fused filament fabrications printers, fused deposition modeling printers, direct ink deposition printers, material jet printers, polyjet printers, ink-jetting printers, material jetting printers, syringe extrusion printers, and combinations thereof. Typically, an extrusion-type printer is utilized for printing the low-density composition on the substrate.

The substrate is not limited and may be any substrate. Typically, the substrate is adapted to support the three-dimensional article during the method of forming. However, the substrate itself may be supported (e.g. by a table or bench), such that the substrate may be a flexible layer or coating (e.g. a release coating, paint, etc.) and need not have inherent rigidity. Likewise, the substrate may be a floor or other surface of a structure, or may be a natural surface (e.g. the ground).

As described above, the method generally involves additive manufacturing/3D printing. As such, as readily understood in the art of additive manufacturing (AM) and/or three-dimensional (3D) printing, the at least one layer formed by printing the low-density composition is not limiting, as the three-dimensional article may comprise any number of layers. Moreover, a portion of the low-density composition may be printed on another portion of the low-density composition before the other portion has cured/set, such that both portions fuse and form a single layer.

The low-density composition is described in further detail herein, and is to be understood in view of the description and examples below. In general, the low-density composition comprises a (P) polymer component and (M) a microsphere component. The polymer component (P) prepares the structure of the low-density three-dimensional article once printed (i.e., the low-density three-dimensional article comprises a polymer/plastic structure formed from the polymer component (P)). As such, the low-density composition is typically a thermoplastic and/or thermoset composition, depending on the particular polymer component (P) selected, to facilitate printing of the low-density composition. As described in further detail below, the microsphere component (M) is utilized to lower the density of the polymer structure thus prepared from the polymer component (P).

In certain embodiments, the polymer component (P) comprises, alternatively is, an acrylonitrile-butadiene-styrene (ABS) resin. In such embodiments, the low-density composition is typically a thermoplastic composition, due to the amorphous thermoplastic nature of ABS resins. In some embodiments, the polymer component (P) comprises, alternatively is, a polyamide (PA) resin. Specific examples of suitable polyamide resins for use in, or as, the polymer component (P) include Nylon 6 (i.e., PA6, polycaprolactam, etc.) and Nylon 12 (i.e., PA12, polylaurolactam, polylaurinlactam, etc.). However, other polyamides or blends of polyamides may also be utilized.

The polymer component (P) may comprise a filler, such as a fiber and/or. For example, in certain embodiments, the polymer component (P) comprises a fiber. Examples of fibers include natural fibers (e.g. wood fibers, cotton fibers, agricultural fibers, lignins, starches, celluloses, etc.) and synthetic fibers (e.g. carbon fibers, aramid fibers, nylon fibers, glass fibers, etc.). The amount of filler utilized may vary, and will be selected based on the type of fiber selected, the processability of the polymer component (P) formed therewith, etc. In general, when utilized, the polymer component (P) comprises the filler in an amount of from greater than 0 to 30 wt. %, based on the weight of the polymer component (P). However, amounts outside this range may also be utilized, such as an amount greater than 30, alternatively greater than 40, alternatively greater than 50 wt. %, based on the weight of the polymer component (P). In certain embodiments, the polymer component (P) comprises a carbon fiber filler in an amount of from 15 to 25, alternatively of 20 wt. %, based on the weight of the polymer component (P).

As introduced above, the microsphere component (M) is utilized to lower the density of the polymer/plastic structure prepared from the polymer component (P) once printed. More specifically, the microsphere component (M) is selected to foam the polymer component (P) during the printing of the low-density composition such that the first layer formed therefrom is a foam. The particular type of foam so formed (i.e., whether open and/or closed-celled) may be controlled by the selection of the microsphere component (M).

In certain embodiments the microsphere component (M) comprises hollow glass microspheres (HGMs). In such embodiments, printing the low-density composition forms a syntactic foam, i.e., a closed-celled foam comprising a polymer matrix formed from the polymer component (P) disposed about the HGMs (pores) providing the three-dimensional article with a significant weight reduction and mechanical reinforcement as compared to articles formed purely from the polymer component (P) without the HGMs.

The HGMs suitable for use in, or as, the microsphere component (M) are not limited. HGMs are generally differentiated by their bulk density, particle size, crush strength (e.g. as controls by sphere wall thickness), surface characteristics (e.g. surface treatments and/or coatings), etc. The particular HGMs utilized will be selected by those of skill in the art in view of these characteristics/properties, e.g. in view of the particular polymer component (P) selected, the particular 3D printer being utilized, the three-dimensional article to be formed, etc. In some embodiments, HGMs comprising soda-lime-borosilicate glass are utilized. In these or other embodiments, the HGMs comprise a surface treatment and/or coating, e.g. to enhance the compatibility of the microsphere component (M) with the polymer component (P) and/or promote the flow of HGMs in the matrix of the polymer component (P). Likewise, the HGMs may be filamented or otherwise treated to increase ease of handling, e.g. to prevent elutriation during the method. Typically, the HGMs selected will comprise uniformity with respect to each other, e.g. with regard to material composition, particle size (i.e., average diameter), etc. For example, the HGMs are typically substantially uniform in diameter and wall thickness, and are resistant to high temperatures and chemical attack from other components of the low-density composition.

In some embodiments, HGMs of a particular particle size are utilized to control the pore size of the syntactic foam of the three-dimensional article formed via the method. In certain embodiments, the microsphere component (M) comprises HGMs having an average diameter of from 10 to 50 μm, such as an average diameter of from 10 to 45, alternatively of from 15 to 45, alternatively of from 15 to 40, alternatively of from 15 to 35, alternatively of from 15 to 30 μm. In particular embodiments, the microsphere component (M) comprises HGMs having an average diameter of 20 or 26 μm. However, larger HGMs may also be utilized, such as those having an average diameter of greater than 25, alternatively greater than 35, alternatively greater than 45, alternatively greater than 100 μm.

In certain embodiments the microsphere component (M) comprises expandable microspheres. In such embodiments, printing the low-density composition generally forms a closed-celled foam comprising a polymer matrix formed from the polymer component (P) disposed about pores formed by the expandable microspheres. In these embodiments, the three-dimensional article is prepared with a significant weight reduction as compared to articles formed purely from the polymer component (P). However, the expandable microspheres may also function as, or comprise, a blowing agent, thereby forming an open-celled foam or open-celled portions in the foam formed therewith.

The expandable microspheres suitable for use in, or as, the microsphere component (M) are not particularly limited. In particular embodiments, the microsphere component (M) comprises expandable thermoplastic microspheres, although other expandable microspheres may be utilized. Expandable thermoplastic microspheres typically comprise a resilient polymer (e.g. a thermoplastic resin, such as an acrylate, styrene, etc.) shell encapsulating a temperature sensitive core. The core typically comprises a hydrocarbon composition comprising one or more low-boiling liquid hydrocarbons (e.g. aliphatic hydrocarbons such as ethane, ethylene, propane, propene, butene, isobutene, neopentane, acetylene, hexane, heptane, etc.). In general, when heated to a temperature high enough to soften the thermoplastic shell, the temperature-induced pressure increase of the hydrocarbon core (i.e., due to vaporization) will force the shell to expand, thereby increasing the diameter and volume of the expandable thermoplastic microspheres. Depending on the particular expandable thermoplastic microspheres selected, upon heating (e.g. to a temperature used for preparing the low-density composition and/or printing the same, as described below) the expandable thermoplastic microspheres may increase in diameter by 2 to 3 times.

The particular HGMs utilized will be selected by those of skill in the art in view of particular properties such as room temperature diameter, expansion factor, diameter at a particular temperature (e.g. a printing temperature), etc., in view of the particular polymer component (P) selected, the particular 3D printer being utilized, the three-dimensional article to be formed, etc. In certain embodiments, the microsphere component (M) comprises expandable microspheres having an average diameter of from 5 to 40 μm, such as an average diameter of from 5 to 35, alternatively of from 5 to 30, alternatively of from 5 to 25, alternatively of from 5 to 20, alternatively of from 10 to 20 μm under ambient conditions (e.g. room temperature and atmospheric pressure). However, expandable microspheres outside these ranges may also be utilized. In particular embodiments, the microsphere component (M) comprises expandable microspheres having an average diameter of from 10 to 15 μm at room temperature and an average diameter of from 35 to 45 μm during printing.

In general, the low-density composition comprises the polymer component (P) and the microsphere component (M) in a ratio (P):(M), which is typically expressed in terms of a ratio by volume (e.g. a vol. % (M) in (P), or a vol. % (M) based on the total volume of the low-density composition). However, the ratio (P):(M) may be expressed in terms of a weight ratio, such as a wt. % (M) in (P) or a wt. % (M) based on the total weight of the low-density composition. The ratio (P):(M) may vary, and will be selected based on the particular polymer component (P) being utilized, the particular microsphere component (M) being utilized, a desired property of the three-dimensional article being formed (e.g. density, compression strength, etc.), etc., as will be understood in view of the embodiments and examples described herein.

In certain embodiments, the microsphere component (M) comprises the HGMs, and the low-density composition comprises the HGMs in an amount of from 10 to 50 vol. %, based on the total volume of the low-density composition. In some such embodiments, the low-density composition comprises the HGMs in an amount of 10, alternatively 20, alternatively 30, alternatively 40, alternatively 50 vol. %, based on the total volume of the low-density composition. In particular embodiments, the microsphere component (M) comprises the expandable thermoplastic microspheres, and the low-density composition comprises the expandable thermoplastic microspheres in an amount of from 2 to 5, alternatively of from 2.5 to 4 wt. %, based on the total weight of the low-density composition. In certain embodiments, the low-density composition comprises 2.5 wt. % of the expandable thermoplastic microspheres. In other embodiments, the low-density composition comprises 4 wt. % of the expandable thermoplastic microspheres.

As introduced above, the method comprises selectively controlling the density of the low-density composition during printing to give the at least one layer on the substrate. In particular, as introduced above, the microsphere component (M) is utilized to lower the density of the polymer/plastic structure prepared from the polymer component (P) once printed. Accordingly, selectively controlling the density of the low-density composition comprises varying the ratio (P):(M) during printing, where increasing the relative amount of the microsphere component (M) comparatively decreases the density of the low-density composition, and thus also the density of the three-dimensional article formed via printing the low-density composition. Likewise, decreasing the relative amount of the microsphere component (M) comparatively increases the density of the low-density composition, and thus also the density of the three-dimensional article formed via printing the low-density composition. In this manner, the density of the low-density composition being printed may be selectively controlled based on the formulation of the low-density composition being fed or otherwise introduced to the 3D printer being utilized. Likewise, local densities of the three-dimensional article being formed with the method may be independently selected and controlled, e.g. by switching/blending material feedstock (i.e., the low-density composition, or the components thereof) at or before entry into the 3D printer or a portion thereof (e.g. an extruder). As such, the density of any one low-density composition utilized may be fixed, or the density of the low-density composition may be varied in real-time.

In some embodiments, the method comprises preparing the low-density composition prior to printing the same. Preparing the low-density composition generally comprises combining the polymer component (P) and the microsphere component (M) at a preparation temperature greater than a melting temperature of the polymer component (P), such that the low-density composition is flowable at the preparation temperature. Said differently, no other steps are generally required aside from combining the polymer component (P) and the microsphere component (M) at the preparation temperature. However, mechanical mixing is typically utilized to homogenize the low-density composition one the components are combined, or during the combination. The preparation temperature will be selected based on the particular polymer component (P) selected (i.e., based on a melting and/or glass transition temperature thereof). Typically, the preparation temperature is from 190 to 260° C., such as 190, 200, 210, 230, 250, or 260° C.

In addition to the polymer component (P) and the microsphere component (M), the low-density composition may comprise additives, such as those suitable for improving the printability of the low-density composition and/or achieving a desired property in the three-dimensional article being prepared. Such additives may be combined with a preformed mixture of the polymer component (P) and the microsphere component (M), or may be combined with one of those components prior to their combination to prepare the low-density composition.

In general, the method comprises repeating the process outlined above (e.g. printing the low-density composition and selectively controlling the density of the low-density composition during printing) to form additional layer(s), thereby forming the low-density three-dimensional article.

As understood in the art of additive manufacturing (AM) and/or three-dimensional (3D) printing, the number of additional layers is not limited, and may be a single additional layer or any number of additional layers. For example, the method may comprise forming greater than 2, alternatively greater than 5, alternatively greater than 10, alternatively greater than 25, alternatively greater than 50, alternatively greater than 100, alternatively greater than 500, alternatively greater than 1000, alternatively greater than 2500, alternatively greater than 5000 layers, depending on the particular three-dimensional article being formed and the particular low-density composition(s) utilized.

In general, the low-density composition is printed at a printing temperature, which is typically high enough to place or maintain the low-density composition in a flowable state during printing. As such, the printing temperature will be selected based on the particular polymer component (P) selected (i.e., based on a melting and/or glass transition temperature thereof). Accordingly, the printing temperature may be the same as or different from the preparation temperature. In certain embodiments, the printing temperature is from 190 to 260° C., such as 190, 200, 210, 230, 250, or 260° C.

As introduced above, the method prepares a low-density three-dimensional article. The low-density three-dimensional article is not limited, and may be a structure or a component of a structure, a component of a vehicle, a construction material, etc. In view of the embodiments described above, one of skill in the art will understand that the three-dimensional article need not be entirely composed of low-density materials, but instead may comprise low-density portions in its structure. In certain embodiments, the low-density three-dimensional article comprises a total density of from 0.25 to 0.85 g/cc. In some embodiments, the low-density three-dimensional article comprises a total density of from 0.75 to 0.85 g/cc. In other embodiments, the low-density three-dimensional article comprises a total density of from 0.2 to 0.4 g/cc. In particular embodiments, the low-density three-dimensional article comprises one or more portions having a density of from 0.25 to 0.85 g/cc, such as portions having a density of from 0.2 to 0.4 g/cc and/or portions having a density of from 0.75 to 0.85 g/cc.

The following examples, illustrating methods of printing various low-density compositions and three-dimensional articles formed thereby, are intended to illustrate and not to limit the invention.

Example 1: ABS+10 Vol % HGM

Matrix: Acrylonitrile-butadiene-styrene (ABS); density 1.03 g/cc.
Filler: Hollow glass microsphere (HGM); composition (soda-lime borosilicate glass):

| Glass Bubble | | | | |
| --- | --- | --- | --- | --- |
| Density (g/cc) | Strength (psi) | Average Particle Diameter (μm) | Average Wall Thickness (μm) | Volume % of Gas |
| 0.46 | 16,000 | 20 | 0.72 | 80 |

Mixing condition: 200° C.; screw speed 60 rpm; duration 4 minutes.
Composite formulation: ABS+10 vol % HGM; density of the composites: 0.973 g/cc.

Example 2: ABS+20 Vol % HGM

Matrix: Acrylonitrile-butadiene-styrene (ABS); density 1.03 g/cc.
Filler: Hollow glass microsphere (HGM); composition (soda-lime borosilicate glass):

| Glass Bubble | | | | |
| --- | --- | --- | --- | --- |
| Density (g/cc) | Strength (psi) | Average Particle Diameter (μm) | Average Wall Thickness (μm) | Volume % of Gas |
| 0.46 | 16,000 | 20 | 0.72 | 80 |

Mixing condition: 200° C.; screw speed 60 rpm; duration 4 minutes.
Composite formulation: ABS+20 vol % HGM; density of the composites 0.916 g/cc.

Example 3: ABS+30 Vol % HGM

Matrix: Acrylonitrile-butadiene-styrene (ABS); density 1.03 g/cc.
Filler: Hollow glass microsphere (HGM); composition (soda-lime borosilicate glass):

| Glass Bubble | | | | |
| --- | --- | --- | --- | --- |
| Density (g/cc) | Strength (psi) | Average Particle Diameter (μm) | Average Wall Thickness (μm) | Volume % of Gas |
| 0.46 | 16,000 | 20 | 0.72 | 80 |

Mixing condition: 200° C.; screw speed 60 rpm; duration 4 minutes.
Composite formulation: ABS+30 vol % HGM; density of the composites 0.859 g/cc.

Example 4: ABS+40 Vol % HGM

Matrix: Acrylonitrile-butadiene-styrene (ABS); density 1.03 g/cc.
Filler: Hollow glass microsphere (HGM); composition (soda-lime borosilicate glass):

| Glass Bubble | | | | |
| --- | --- | --- | --- | --- |
| Density (g/cc) | Strength (psi) | Average Particle Diameter (μm) | Average Wall Thickness (μm) | Volume % of Gas |
| 0.46 | 16,000 | 20 | 0.72 | 80 |

Mixing condition: 200° C.; screw speed 60 rpm; duration 4 minutes.
Composite formulation: ABS+40 vol % HGM; density of the composites 0.802 g/cc.

Example 5: ABS+50 Vol % HGM

Matrix: Acrylonitrile-butadiene-styrene (ABS); density 1.03 g/cc.
Filler: Hollow glass microsphere (HGM); composition (soda-lime borosilicate glass):

| Glass Bubble | | | | |
|---|---|---|---|---|
| Density (g/cc) | Strength (psi) | Average Particle Diameter (μm) | Average Wall Thickness (μm) | Volume % of Gas |
| 0.46 | 16,000 | 20 | 0.72 | 80 |

Mixing condition: 200° C.; screw speed 60 rpm; duration 4 minutes.
Composite formulation: ABS+50 vol % HGM; density of the composites 0.745 g/cc.

Example 6: ABS+50 Vol % HGM

Matrix: Acrylonitrile-butadiene-styrene (ABS); density 1.03 g/cc.
Filler: Hollow glass microsphere (HGM); composition (soda-lime borosilicate glass):

| Glass Bubble | | | | |
|---|---|---|---|---|
| Density (g/cc) | Strength (psi) | Average Particle Diameter (μm) | Average Wall Thickness (μm) | Volume % of Gas |
| 0.46 | 16,000 | 20 | 0.72 | 80 |

Mixing condition: 250° C.; screw speed 60 rpm; duration 4 minutes.
Composite formulation: ABS+50 vol % HGM; density of the composites 0.745 g/cc.

Example 7: ABS+50 Vol % HGM

Matrix: Acrylonitrile-butadiene-styrene (ABS); density 1.03 g/cc.
Filler: Hollow glass microsphere (HGM) with coating that can facilitate the flow; composition (soda-lime borosilicate glass):

| Glass Bubble | | | | |
|---|---|---|---|---|
| Density (g/cc) | Strength (psi) | Average Particle Diameter (μm) | Average Wall Thickness (μm) | Volume % of Gas |
| 0.32 | 8,000 | 26 | N/A | N/A |

Composite formulation: ABS+50 vol % HGM; density of the composites 0.675 g/cc.

Example 8: Carbon Fiber Filled ABS+20 Vol % HGM

Matrix: 20 wt. % carbon fiber filled Acrylonitrile-butadiene-styrene (ABS); density 1.14 g/cc.
Filler: Hollow glass microsphere (HGM); composition (soda-lime borosilicate glass):

| Glass Bubble | | | | |
|---|---|---|---|---|
| Density (g/cc) | Strength (psi) | Average Particle Diameter (μm) | Average Wall Thickness (μm) | Volume % of Gas |
| 0.46 | 16,000 | 20 | 0.72 | 80 |

Mixing condition: 200° C.; screw speed 60 rpm; duration 4 minutes.
Composite formulation: Carbon fiber filled ABS+20 vol % HGM; density of the composites 1.004 g/cc.

Example 9: Carbon Fiber Filled ABS+50 Vol % HGM

Matrix: 20 wt. % carbon fiber filled Acrylonitrile-butadiene-styrene (ABS); density 1.14 g/cc.
Filler: Hollow glass microsphere (HGM); composition (soda-lime borosilicate glass):

| Glass Bubble | | | | |
|---|---|---|---|---|
| Density (g/cc) | Strength (psi) | Average Particle Diameter (μm) | Average Wall Thickness (μm) | Volume % of Gas |
| 0.46 | 16,000 | 20 | 0.72 | 80 |

Mixing condition: 200° C.; screw speed 60 rpm; duration 4 minutes.
Composite formulation: Carbon fiber filled ABS+50 vol % HGM; density of the composites 0.8 g/cc.

Example 10: Carbon Fiber Filled ABS+50 Vol % HGM

Matrix: 20 wt. % carbon fiber filled Acrylonitrile-butadiene-styrene (ABS); density 0.73 g/cc.
Filler: Hollow glass microsphere (HGM); composition (soda-lime borosilicate glass):

| Glass Bubble | | | | |
|---|---|---|---|---|
| Density (g/cc) | Strength (psi) | Average Particle Diameter (μm) | Average Wall Thickness (μm) | Volume % of Gas |
| 0.32 | 8,000 | 26 | N/A | N/A |

Mixing condition: 200° C.; screw speed 60 rpm; duration 4 minutes.
Composite formulation: Carbon fiber filled ABS+50 vol % HGM; density of the composites 0.8 g/cc.

Examples 11a-e: ABS+2.5 wt. % Expandable Microspheres

Expandable microspheres (thermoplastic polymer shell (2 μm thickness) encapsulating hydrocarbon core; 12 μm room temperature diameter; ~40 μm expanded diameter) are distributed in polyvinyl acetate to form a high concentration (65 wt. %) master-batch. ABS pellets and high expandable microsphere concentrated master-batch are added into the extruder spontaneously.
Extrusion conditions: barrel zone temperatures:

| Example | Barrel Zone Temperature (° C.) |
|---|---|
| 11a | 190 |
| 11b | 210 |
| 11c | 230 |

-continued

| Example | Barrel Zone Temperature (° C.) |
|---|---|
| 11d | 248 |
| 11e | 260 |

Screw rotating speed: 350 rpm.
Composite formulation: ABS+2.5 wt. % expandable microsphere

Example 12: Syntactic Foam: ABS 20 wt. % Carbon Fiber+22 wt. % (50 Vol. %) Hollow Glass Sphere A composite material is prepared by melt blending and extruding acrylonitrile butadiene styrene (ABS) with 20 wt. % of carbon fiber and 22 wt. % (50 vol. %) of hollow glass spheres. The composite material is a syntactic foam having a bulk density of 0.7 g/cc.

Example 13: Expanding Foam: Extruded ABS with 4 wt. % Expandable Microspheres Acrylonitrile butadiene styrene (ABS) is dry blended with 4 wt. % expandable microspheres, and the dry blend is then printed to give a closed-cell expanded foam having a bulk density of about 0.25 g/cc.

Examples 14a-e and Comparative Example 1

Three dimensional articles are prepared from various low-density compositions, as shown in Table 1 below:

TABLE 1

| Example | Low-Density Composition | Low-Density Material | Density (g/cc) |
|---|---|---|---|
| 14a | ABS + CF + HGMs | Syntactic foam | 0.85 |
| 14b | PA6 + CF + HGMs | Syntactic foam; semi-crystalline matrix | 0.85 |
| 14c | PA12 + CF + HGMs | Syntactic foam; semi-crystalline matrix | 0.78 |
| 14d | ABS + CF with expandable spheres | Expanding foam; amorphous matrix | 0.3 |
| 14e | PA6 with expandable spheres | Expanding foam; semi-crystalline matrix | 0.3 |
| 14e | PA12 with expandable spheres | Expanding foam; semi-crystalline matrix | 0.3 |

HGM: hollow glass microspheres;
ABS: Acrylonitrile-butadiene-styrene;
PA: polyamide
PA6: Nylon 6 (i.e., polycaprolactam)
PA12: Nylon 12 (i.e., polylaurolactam, polylaurinlactam, etc.).
Weight reduction in resulting materials reaches 35% for neat ABS and 36% for 20 wt. % carbon fiber filled ABS.

Example 15: Tensile Properties of 3D-Printed Syntactic Foams

Material:
A low-density composition is prepared by combining acrylonitrile butadiene styrene (ABS) with 33 wt % (50 vol %) hollow glass microspheres and 10 wt % carbon fiber. The formulation of the low-density composition is designed to ensure proper flow behavior of the material during the printing process, provide good dimensional stability of printed parts after the solidification process, and minimize or prevent warping of the part post-print. The bulk density of the material is about 0.85 g/cc.

Sample Preparation and Uniaxial Tensile Test:
Hexagons are printed at two different layer times, 20 seconds and 40 seconds, in order to demonstrate the effect of layer time on the adhesive strength between layers (i.e., property in the z-direction). Dog-bone shape specimens (ASTM D638 Type 1) are machined from the printed hexagons in both printing (x) and interlayer (z) directions. The dog bone samples are then tensile tested following ASTM standard D638 in order to determine their elastic modulus and tensile strength. The test is performed at a rate of 0.001 inch/second. To measure the strain distribution, digital image correlation (DIC) images are collected during testing.

Results
Layer orientation is shown to play an important role in the tensile properties of the syntactic foam samples. Samples oriented in the x-direction show significantly higher elastic modulus and tensile strength properties compared to the samples oriented in the z-direction. Dog bone samples machined from part layers parallel to the printing (x) direction are composed of material layers along the length of the tensile bar. When stress is applied, the sample exhibits a higher elastic modulus, as well as a higher tensile strength due to better adhesion of adjacent layers. Samples machined from layers in the interlayer (z) direction are composed of short layers across the width of the bar. These samples show a lower resistance to deformation, possibly from failure at layer interfaces.

Differences between 20 and 40 second layer times for both layer orientations are not significant. A slight improvement in tensile properties is observed for the 40 second layer time in the x-direction. The z-direction bars show somewhat higher values for the 20 second layer time.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. The technology disclosed and claimed herein may be available for licensing in specific fields of use by the assignee of record.

The invention claimed is:
1. A method of forming a low-density three-dimensional article, said method comprising:
A) printing a low-density composition on a substrate via extrusion deposition to form at least one layer comprising the low-density composition, wherein the low-density composition is a thermoplastic comprising a polymer component (P) and a microsphere component (M) in a ratio by volume (P):(M);

B) selectively controlling a density of the low-density composition during printing A) by varying the ratio (P):(M) during extrusion deposition of the low-density composition to give the at least one layer on the substrate; and C) repeating A) and B) to form additional layer(s).

2. The method of claim 1, wherein the polymer component (P) comprises an acrylonitrile-butadiene-styrene (ABS) resin.

3. The method of claim 1, wherein the polymer component (P) comprises a polyamide resin.

4. The method of claim 1, wherein the microsphere component (M) comprises hollow glass microspheres.

5. The method of claim 4, wherein the low-density composition comprises the hollow glass microspheres of the microsphere component (M) in an amount of from 10 to 50 vol. %, based on the total volume of the low-density composition.

6. The method of claim 4, wherein the hollow glass microspheres comprise soda-lime-borosilicate glass.

7. The method of claim 4, wherein the hollow glass microspheres comprise an average diameter of from 10 to 50 µm.

8. The method of claim 1, wherein the microsphere component (M) comprises expandable microspheres.

9. The method of claim 8, wherein the expandable microspheres comprise an average diameter of from 10 to 15 µm at room temperature and an average diameter of from 35 to 45 µm during printing.

10. The method of claim 8, wherein the expandable microspheres are further defined as expandable thermoplastic microspheres.

11. The method of claim 10, wherein the expandable thermoplastic microspheres each comprise a thermoplastic shell disposed about a hydrocarbon composition.

12. The method of claim 10, wherein the low-density composition comprises the expandable thermoplastic microspheres of the microsphere component (M) in an amount of from 2 to 5 wt. %, based on the total weight of the low-density composition.

13. The method of claim 1, wherein the low-density composition further comprises a carbon fiber filler.

14. The method of claim 13, wherein the low-density composition comprises the carbon fiber filler in an amount of from greater than 0 to 30 wt. % based on the weight of the polymer component (P).

15. The method of claim 1, further comprising preparing the low-density composition prior to deposition, wherein preparing the low-density composition comprises combining the polymer component (P) and the microsphere component (M) at a preparation temperature greater than a melting temperature of the polymer component (P), such that the low-density composition is flowable at the preparation temperature.

16. The method of claim 15, wherein the preparation temperature is from 190 to 260° C.

17. The method of claim 15, wherein printing A) comprises depositing the low-density composition at a printing temperature to form the at least one layer, and wherein the printing temperature is equal to or greater than the preparation temperature.

* * * * *